Dec. 8, 1964 J. R. LOVETTE 3,160,002
AUTOMATIC MULLEN TESTER OR BURST TESTER
Filed Dec. 29, 1961 9 Sheets-Sheet 1

FIG. I.

INVENTOR
J. R. Lovette

BY Mawhinney & Mawhinney
ATTORNEYS

Dec. 8, 1964  J. R. LOVETTE  3,160,002
AUTOMATIC MULLEN TESTER OR BURST TESTER
Filed Dec. 29, 1961  9 Sheets-Sheet 2

INVENTOR
J. R. Lovette

BY Mawhinney & Mawhinney
ATTORNEYS

FIG. 4.

INVENTOR
J. R. Lovette

Dec. 8, 1964    J. R. LOVETTE    3,160,002
AUTOMATIC MULLEN TESTER OR BURST TESTER
Filed Dec. 29, 1961    9 Sheets-Sheet 4

INVENTOR
J. R. Lovette

BY Mawhinney & Mawhinney
ATTORNEYS

Dec. 8, 1964   J. R. LOVETTE   3,160,002
AUTOMATIC MULLEN TESTER OR BURST TESTER
Filed Dec. 29, 1961   9 Sheets-Sheet 5

INVENTOR
J. R. Lovette

BY Mawhinney & Mawhinney
ATTORNEYS

Dec. 8, 1964  J. R. LOVETTE  3,160,002
AUTOMATIC MULLEN TESTER OR BURST TESTER
Filed Dec. 29, 1961  9 Sheets-Sheet 6

FIG. 10a.

INVENTOR
J. R. Lovette
BY
ATTORNEYS

FIG. 10b.

Dec. 8, 1964 J. R. LOVETTE 3,160,002
AUTOMATIC MULLEN TESTER OR BURST TESTER
Filed Dec. 29, 1961 9 Sheets-Sheet 8

INVENTOR
J. R. Lovette
BY Mawhinney & Mawhinney
ATTORNEY

Dec. 8, 1964   J. R. LOVETTE   3,160,002
AUTOMATIC MULLEN TESTER OR BURST TESTER
Filed Dec. 29, 1961   9 Sheets-Sheet 9

INVENTOR
J. R. Lovette

BY Maw Pinney & Maw Pinney
ATTORNEYS

# United States Patent Office 3,160,002
Patented Dec. 8, 1964

3,160,002
AUTOMATIC MULLEN TESTER OR
BURST TESTER
Jeremiah R. Lovette, Flemington, Pa.
(339 S. Fairview St., Lock Haven, Pa.)
Filed Dec. 29, 1961, Ser. No. 163,128
3 Claims. (Cl. 73—102)

The present invention relates to automatic Mullen tester and process of Mullen testing, and has for an object to provide a testing machine or apparatus for testing the bursting strength of materials such as paper, cloth, aluminum foil and the like in which a strip of test material or sample, of any desired length, may be automatically subjected to certain sequential steps which include a stepwise movement of the sample, clamping of the sample in a Mullen testing device, initiating the action causing bursting of the sample, and re-cycling to obtain a number of bursting tests.

In a further aspect of the invention, the automatic action may be extended to the operation of a recorder for recording the pressure required to cause the burst and to totalize the bursting pressure readings on a counting device and to count the number of bursts on a burst counting device so that the testing personnel may divide the number of burst figure into the totalized pressure readings figure and thereby compute the average bursting strength across the full length of the sample, the automatic action concluding in shutting down and readying of the apparatus for the next test.

A further object of the invention is to provide an automatic Mullen tester possessing novel ease of operation, accuracy, repeatability, reliability in action and which will relieve testing personnel for other duties by virtue of its automatic operation.

With the foregoing and other objects in view, the invention will be more fully described hereinafter, and will be more particularly pointed out in the claims appended hereto.

In the drawings, wherein like symbols refer to like or corresponding parts throughout the several views.

Figures 7, 8, 9, 12:
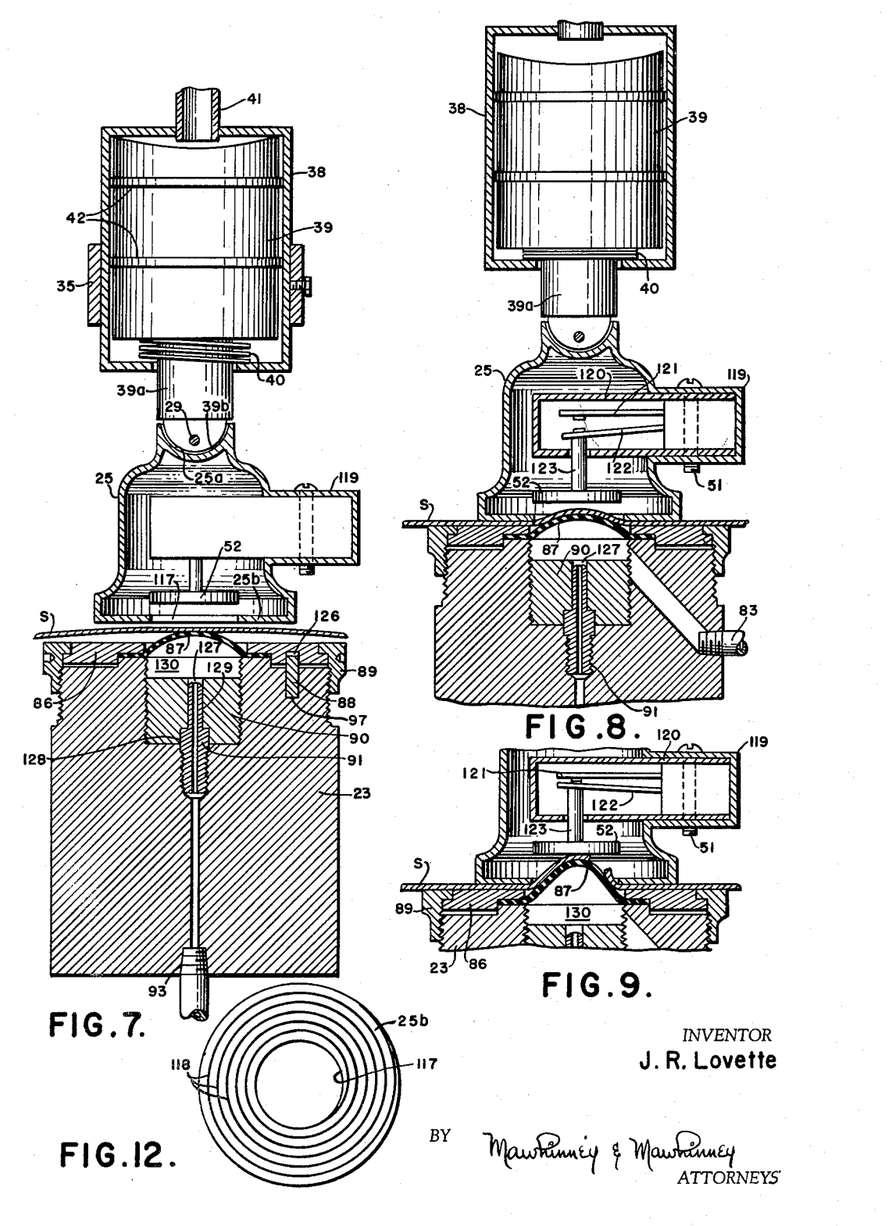
FIGURE 7 is a central vertical sectional view taken on an enlarged scale through the Mullen testing unit illustrating the sample in an initial position thereon.
FIGURE 8 is a similar view showing the clamping head lowered and the sample clamped over the Mullen expansible diaphragm.
FIGURE 9 is a view similar to FIGURES 7 and 8 showing the expansion of the rubber diaphragm, the rupture of the sample and the resultant closing of a switch for discontinuing supply of fluid pressure and initiating other operations as later described.
FIGURE 12 is a bottom plan view of the clamping head.

Referring more particularly to the drawings, S in FIGURES 7, 8 and 9 designates a sample comprising a strip of test material of a preselected length in the act of being processed through the machine.

GENERAL ORGANIZATION

Figure 1:
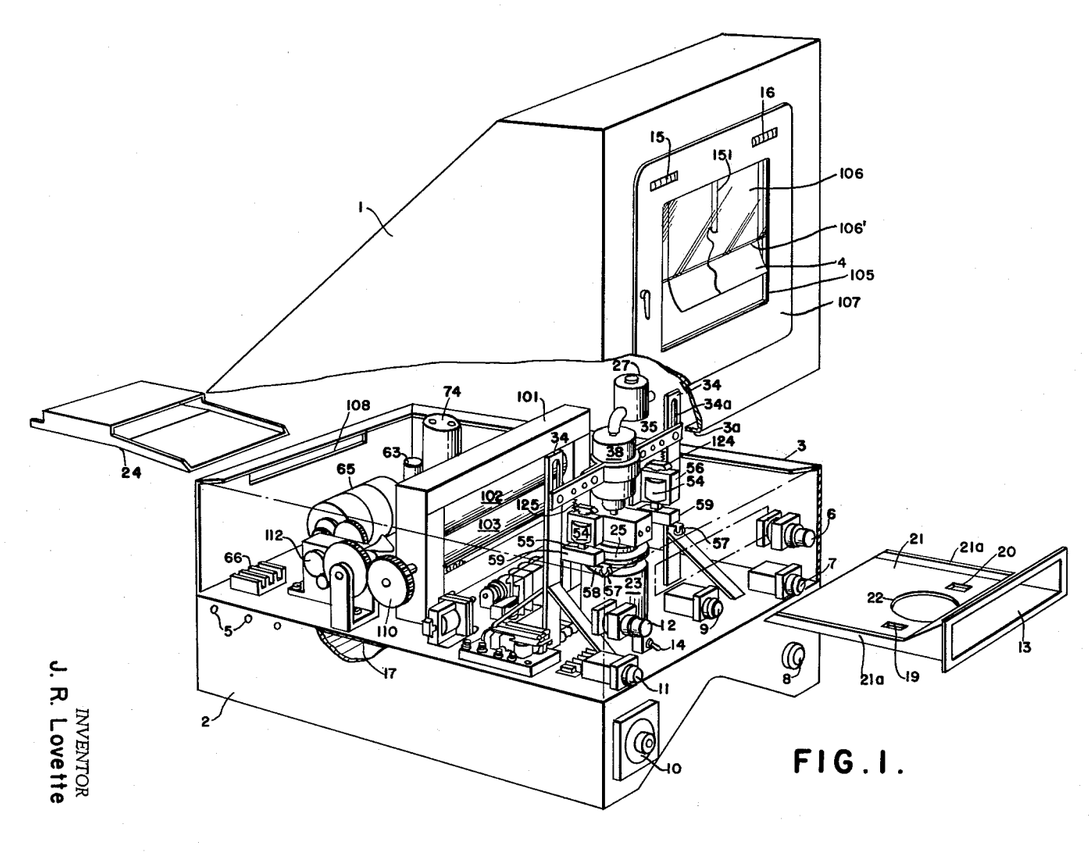
FIGURE 1 is an isometric view with parts broken away and parts shown in section of an automatic Mullen tester constructed in accordance with the present invention.
Figure 2:
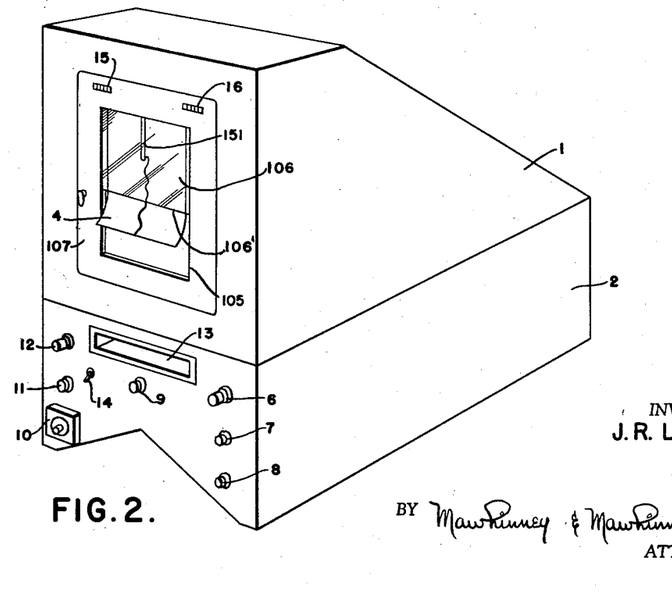
FIGURE 2 is a similar view of the apparatus in its enclosed form showing front panel control devices.
Figures 5, 6:
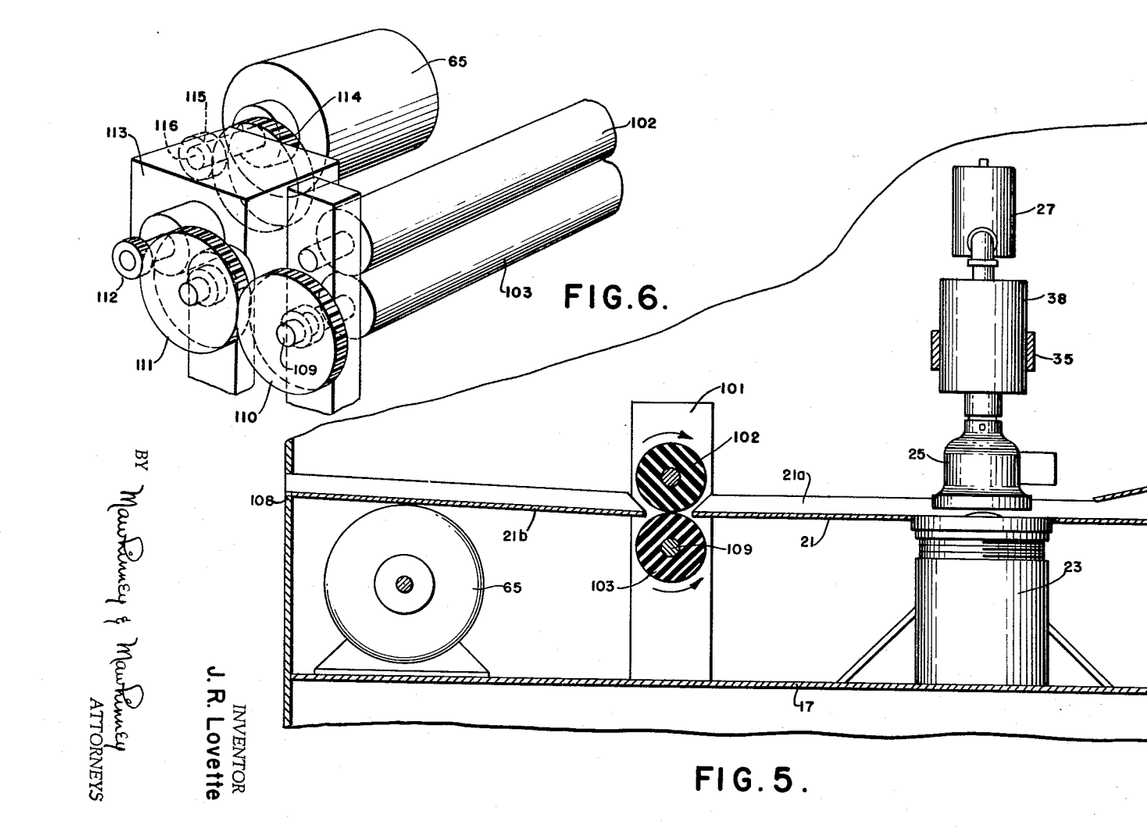
FIGURE 5 is a longitudinal central sectional view taken through upper and lower sections of the case illustrating particularly the Mullen unit in relation to sample receiving and supporting trays and a roller unit for intermittently advancing the sample or strip of material through the machine.
FIGURE 6 is a fragmentary perspective view illustrating a form of drive for the feeding rolls.

As appears more particularly in FIGURES 1, 2 and 5, the machine may be contained in a case preferably made in two sections of aluminum sheet material or other desired material of appropriate gauge, the top section of which is indicated by the numeral 1 and the bottom section by the numeral 2.

As best illustrated in FIGURE 1, inturned flanges 3 and 3ª on the top edges of the bottom section 2 and on the lower edges of the top section 1 are adapted to mate and be secured together by any appropriate fastenings; for instance by suitable bolts or screws.

Figure 3:
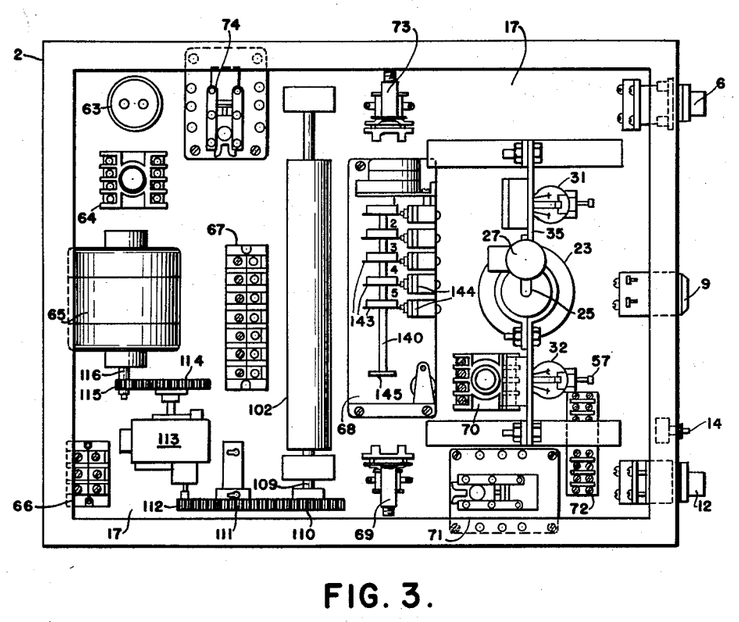
FIGURE 3 is a top plan view taken on a magnified scale with the top cover removed and showing a form of general plan of relative arrangement of the various units composing the apparatus.

The top half 1 of the case has two holes cut in it; one hole to facilitate the mounting of the recording chart 4, the other to receive a removable cover plate. This cover plate is located on the sloping rear wall of the case upper section 1 and when it is removed all the components illustrated in FIGURE 3 are revealed and accessible. Access can also be had to the back of the recorder chart case that is flush mounted through the hole in the front wall of the top half 1 of the tester case.

The recorder chart is a standard instrument having a totally enclosed case with a hinged door 107 on its front wall. The measuring element, the counters, the chart drive mechanism and the integrating or totalizing mechanism are all mounted on the inside of the instrument case. The instrument case door 107 has a rectangular shaped opening 105 partially covered with a glass window 106 having a sharp edge 106′ ground on its lower portion. The chart drive mechanism is so constructed that it fits the rectangular hole below the sharp edge of the glass when the instrument case door is shut.

The term "recording chart" refers to the complete instrument as above described. The term "chart" refers to the moving paper 4 that the pen 151 writes upon. As far as circuitry is concerned the two wires shown on the wiring diagram supplying power to the recording chart are the only external electrical connections. The two internal motors, namely, the chart drive motor and the integrating or totalizing mechanism motor, are located inside the instrument case. These motors, through electrical and mechanical mechanism (also in the instrument case), are the impetus for the chart drive mechanism, the integrating or totalizing mechanism and the counters (all shown in FIGURE 14).

The integrating or totalizing mechanism is also connected mechanically to the pen as there is a definite relationship between the pen located on the chart and the number of counts that are produced on the totalizing counter. The number of bursts counter is also connected mechanically to the pen and registers one count each time the pen rises from zero. All this wiring is internal in the recorder chart and is standard equipment understood by those familiar with the art.

The paper chart runs out under the sharp edge of the glass and out of the front of the instrument case door where the chart may be torn off by means of the sharp edge glass by the operator after the sample run is completed.

The counters are mounted on the back inside wall of the instrument case protruding forward in such manner that they appear in the small glass windows 15 and 16 located in the upper portion of the instrument case door as shown in FIGURE 1.

Figure 14:
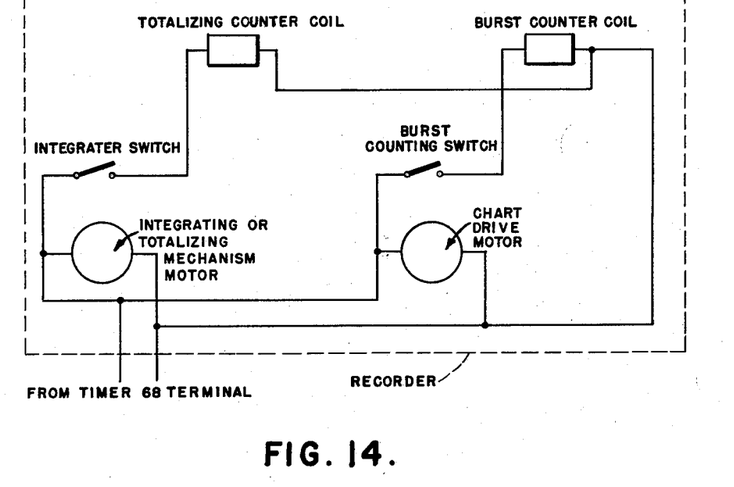
FIGURE 14 is a schematic wiring diagram of a form of recorder chart mechanism.

FIGURE 14 shows the wiring diagram for the recorder chart mechanism with appropriate legends.

Figure 4:
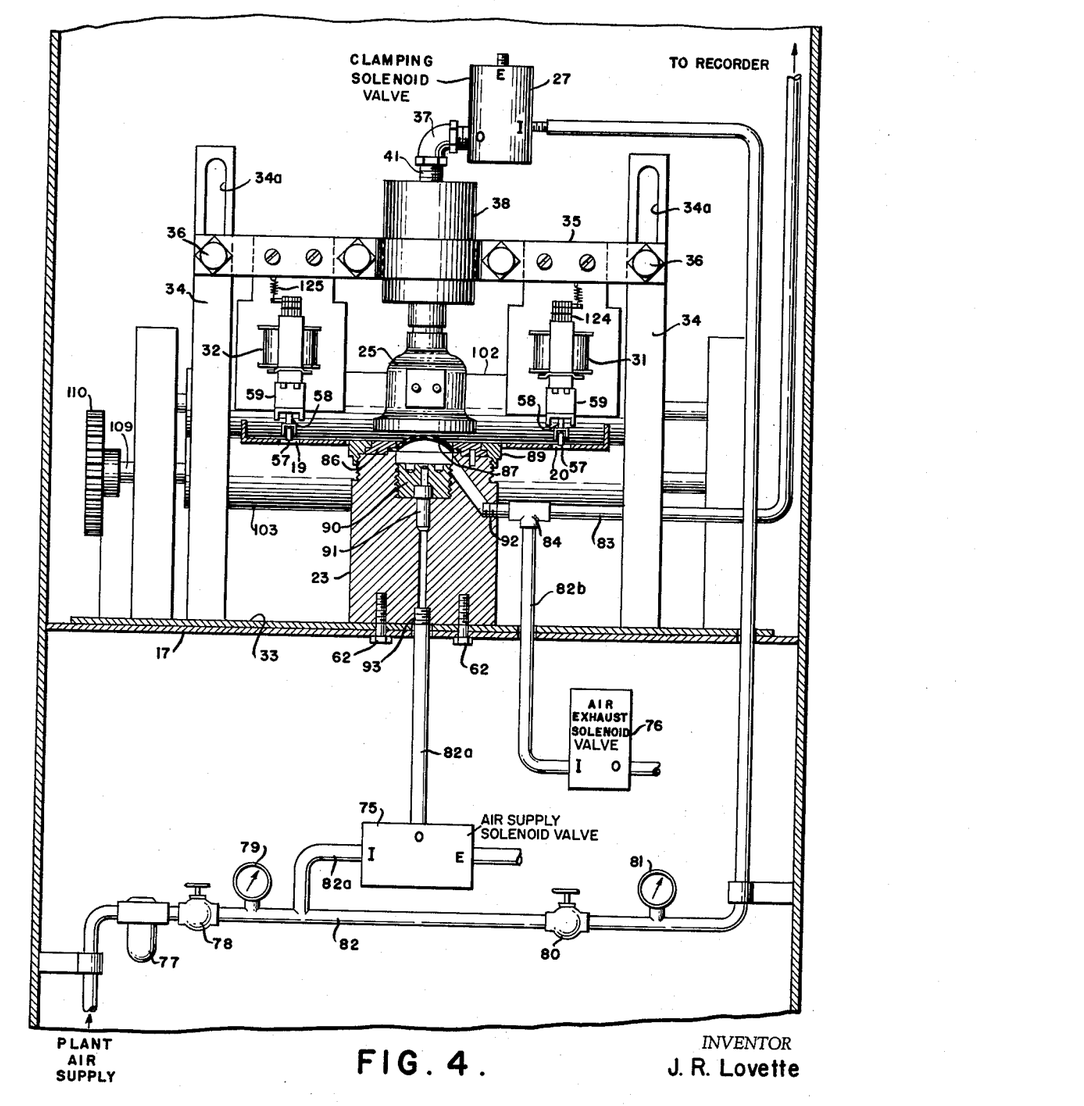
FIGURE 4 is a transverse sectional view taken on a much magnified scale through the apparatus at the central point of the Mullen unit.

In FIGURE 4 the tube 83 is connected to the measuring element in the recorder chart mechanism 4. This measuring element senses the pressure required to cause a burst to take place and, by mechanical connection, positions the pen on the chart accordingly.

Figure 15:
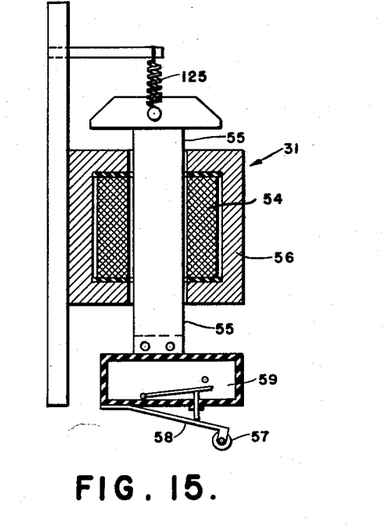
FIGURE 15 is a vertical sectional view taken on an enlarged scale of a form of automatic switch assembly.

Referring more particularly to FIGURE 15, when the coil 54 is energized and the armature 55 moves downward, the roller 57 strikes against the sample, holding the roller arm 58 from further downward movement. Further downward movement of the armature 55 continues whereby the arm 58 closes the normally open contacts of micro switch 59 which thereupon becomes closed. When the coil 54 is de-energized, the spring 125 returns the armature 55 to its normal or raised position, thereby also raising switches 59 so that a new sample may be inserted in the tester without striking the rollers 57 or the arms 58 of the two assemblies 31, 32.

The bottom section 2 supports a base plate 17 held intermediate its height in a substantially horizontal position by rivets 5 or other appropriate fastenings, and on this base plate 17 are installed components of the machine of the invention.

It will be understood that this base plate 17 is a convenient base on which to support the units but the various units and controls may be mounted on the base plate or in the lower section 2, the front wall of which is apertured for the flush mounting of the following components:

Air-on signal light 6;
Manual reverse run motor push button 7;
Manual power-off push button 8;
Automatic-run push button 9;
Air-on timer 10;
Manual forward-run motor push button 11;
Motor-on signal light 12;
Sample entrance chute 13, and
Manual switch for air safety automatic switch assembly and motor final-run switch assembly 14.

The air-on signal light 6, the manual reverse run push button 7, the manual power-off push button 8, the automatic-run push button 9, the manual forward-run push button 11, the motor-on signal light 12 and the manual switch for the air safety automatic switch assembly and motor final-run switch assembly 14 are all standard electrical components of 120 volts, 60 cycle rating and are understood by those familiar with the art.

As shown in FIGURE 1, in the back wall, upper portion of the lower case section 2, is a slot 108 to receive the exit chute 24 by which the sample is discharged from the machine after tests.

SAMPLE FEEDING MECHANISM

Referring more particularly to FIGURES 1, 5 and 6, a sample-carrying tray 21 is positioned to receive the sample through the receiving mouth or opening 13, this tray having upstanding side flanges 21ª defining the width of the tray which is somewhat in excess of the width of the sample supported by the tray in the passage through the machine. A circular hole 22 in the tray is of a size to fit about the tester body assembly 23 in a relationship in which the tray 21 is substantially flush with the upper receiving portion of the tester body assembly 23. Slots 19 and 20 are cut through the bottom of the tray at opposite sides of the circular hole 22 for cooperating with the wands of switches as hereinafter described. The inner end of the tray 21 extends substantially to the nip between a pair of feeding rolls 102 and 103 journalled in a stand 101 which finds its support upon the base plate 17 or other appropriate part.

These rolls may have suitable frictional surfaces for gripping upper and lower surfaces of the sample and pulling the same through the machine from right to left as shown in FIGURE 5. I have found rubber to be a suitable material for at least the surfaces of these rolls 102, 103. Due to the peripheral impingement of these rolls, a single roll, for instance the lower roll 103, may be driven in a counterclockwise direction, as viewed in FIGURE 5, to thereby impart to the upper roll 102 a clockwise rotation, as indicated by the arrows. This conjoint relatively opposite direction of rotation of these rolls will pull the sample strip therethrough and deliver the same to a rear tray 21ᵇ having its forward end disposed adjacent the nip between the rolls and its rear end arranged to deliver the spent sample through the slot 108 to the exit chute 24.

As shown more particularly in FIGURE 6, and also in FIGURE 3, the shaft 109 of the lower roll 103 is extended to fixedly receive a driven pinion 110 in mesh with an idler pinion 111 driven by a pinion 112 being the output of a gear reduction unit 113, the input pinion 114 of which meshes with a pinion 115 fast to the armature shaft 116 of an electric motor 65 which is installed on the base plate 17.

TESTER CLAMPING HEAD ASSEMBLY

Referring more particularly to FIGURES 1 and 4, 34 designates two spaced-apart upright stand posts erected on the base plate 17 or other suitable support and having slot 34ª at suitable portions thereof for receiving the bolts or other fastenings 36 by which a cross bar 35 is adjustably supported. Clamped fixedly to the cross bar 35 is a cylinder 38, shown more particularly in FIGURES 7 and 8, having therein a vertical reciprocating piston 39 biased to an upper position, as shown in FIGURE 7, by a coil spring 40 which is compressed when the plunger or piston 39 is driven downwardly under the action of compressed air or other fluid delivered to the upper end of the cylinder 38 through an air pipe connection 41. The piston may be equipped with suitable compression rings 42 and I find suitable for the purpose rubber O-rings.

When the air pressure above the piston is released, the spring 40 will expand and drive the piston upwardly. The piston rod 39ª projects downwardly through an opening in the cylinder 38 and has a rounded lower end 39ᵇ for fitting in a part-spherical socket 25ª in the upper end of the clamping head 25. The socket 25ª is struck on a somewhat larger radius than the lower round or hemispherical end 39ᵇ of the piston or plunger rod 39ª, thereby allowing a freer fit. The overlapped parts may be pinned or pivoted together by a suitable pin or cotter key 29 which, while suspending the head 25 to move up and down with the plunger 39, also permits a limited lateral swinging movement of the head 25 about the axis of the pin 29 to enable the flat bottom surface 25ᵇ of the head to clamp the sample S evenly each time it moves downwardly to the clamping position of FIGURE 8. The cylinder 38 and piston 39 constitute in effect a motor for driving the clamping head 25 down tightly on the upper portion of the tester body assembly 23 and the motor thus constitutes a clamping positioner.

A solenoid actuated fluid valve 27 is connected by an elbow pipe 37 to the air pipe connection 41 to the cylinder 38.

As shown more particularly in FIGURES 7, 8 and 9, the clamping head 25 is hollow but open internally through a port 117 in its bottom wall 25b.

As shown in FIGURE 12, the external lower flat surface of the bottom wall 25b which is in contact with the sample during testing, as shown in FIGURES 8 and 9, has a continuous spiral 60° V-groove 118 countersunk 0.01 inch or other desired depth and of 1/32 inch pitch or other desired pitch. The groove may start 1/16 of an inch from the edge of the circular port 117 or at other desirable point. The inside edge of the port 117 which comes in contact with the paper during the testing is preferably relieved of sharpness by means of rubbing with crocus cloth. This edge is not rounded off enough to alter the diameter of the opening.

The hollow clamping head 25 has a lateral housing 119 in which is introduced a casing 120 carrying contacts 121 and 122 of an electric switch, normally open as shown in FIGURE 8, the lower contact blade 122 being affixed to a stem 123 of a sensing head 52 which is normally held by the inherent resiliency of the lower switch blade 122 in the pendent position of FIGURES 7 and 8 but is adapted to be encountered and lifted, as shown in FIGURE 9, by the burst sample under the influence of the upward expansion of the rubber or other elastic diaphragm 87 which is mounted in the tester body assembly 23. The parts 121 and 122 constitute a micro switch which may be held in position by one or more bolts 51. When the gum rubber diaphragm 87 bursts the sample and protrudes through the hole in the sample and touches the sensing head 52, the sensing head 52 and shaft or stem 123 are moved upward (FIGURE 9) causing the normally open contacts to close thereby energizing the circuit.

When the gum rubber diaphragm 87 is relieved of air pressure the spring stem contact arm 122 returns the sensing head 52 to its normal lower position and at the same time breaks the circuit that had been energized. Due to the offsetting of the housing 119 the clamping head 25 will be counterweighted on the opposite side so that it hangs level and freely from the cotter key or pivot 29.

Referring to FIGURES 1 and 4, the air safety automatic switch assembly 31 and the motor final-run switch assembly 32 are dependent from the cross bar 35 and held in adjusted position by the bolts 36. If desired the switch assemblies 31 and 32 may have adjustment relatively to the cross bar 35 independently of the bolts 36 and the slots 34a. Switches 31 and 32 are identical in construction and operation but perform different functions as will be later explained. Each of these switches is constructed as follows:

Coil 54 is mounted in a frame 56 and contains a vertically movable armature 55 biased to an upper position by a spring 125, as appears in FIGURE 15. Attached to the lower end of the armature is a roller type micro switch 59 having a movable wand or roller arm 58. Rollers 57 on the arms 58 on the two switches 31 and 32 are located over the slots 20 and 19 in the sample-carrying tray 21. These switches are normally open. When the coils 54 are energized the armatures 55 and the micro switches 59 move downward. When the rollers 57 strike the sample the sample will arrest the further movement of the roller arm 58 and when the switches 59 make further descent they will effect electrical contact and close certain electrical circuits as hereinafter described. When the sample moves past the slots 19 and 20 the rollers 57 drop down into the slots and the electrical contact is broken through switches 59. The switches 31 and 32 are operated manually from the manual switch 14. Complete operation of the switches 31 and 32 are hereinafter more fully explained.

Referring more particularly to FIGURE 4, a mounting plate 33 may be employed in connection with the base plate 17. The various units of the device may be installed on the mounting plate 33 in the first instance independently of the case and for convenience the mounting plate 33 with all units thereon may be deposited upon the base plate 17 and secured thereto in any suitable manner as by bolts or other fastening in any suitable number. The tester body assembly 23 is held by two mounting bolts 62 to the plates 17 and 33.

PLAN AND RELATIVE ARRANGEMENT OF COMPONENTS

Referring to FIGURE 3, the following components, all being standard pieces of equipment understood by those familiar with the art, are assembled and fastened by suitable means to the base plate 17:

Motor capacitor 63;
The three second time delay relay 64;
The 120 volt, 60 cycle, reversing motor 65;
The motor terminal block 66;
The terminal block 67;
The primary sequence timer 68;
The No. 1, 120 volt, 60 cycle, relay, N–C contacts 69;
The thirty-second time delay relay 70;
The holding relay, 120 volt, 60 cycle, N–O contacts 71;
The air-on timer terminal 72;
The No. 2, 120 volt, 60 cycle, relay, N–C contacts 73, and
The holding relay, 120 volts, 60 cycle, N–O contacts 74.

Figure 10A:
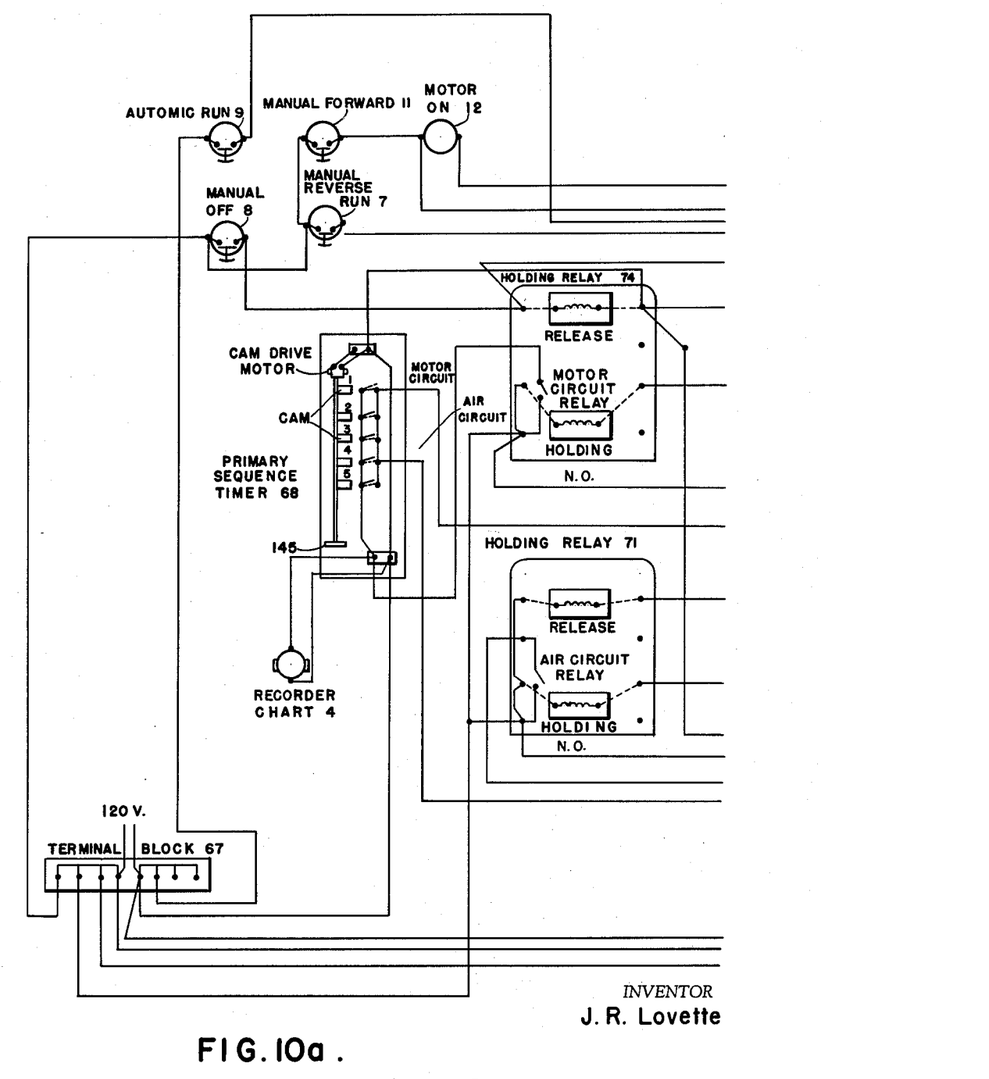
FIGURES 10a and 10b illustrate a form of circuit diagram by which the various units composing the automatic machine may be electrically united and controlled in a preferred form of order and sequence.
Figure 10B:
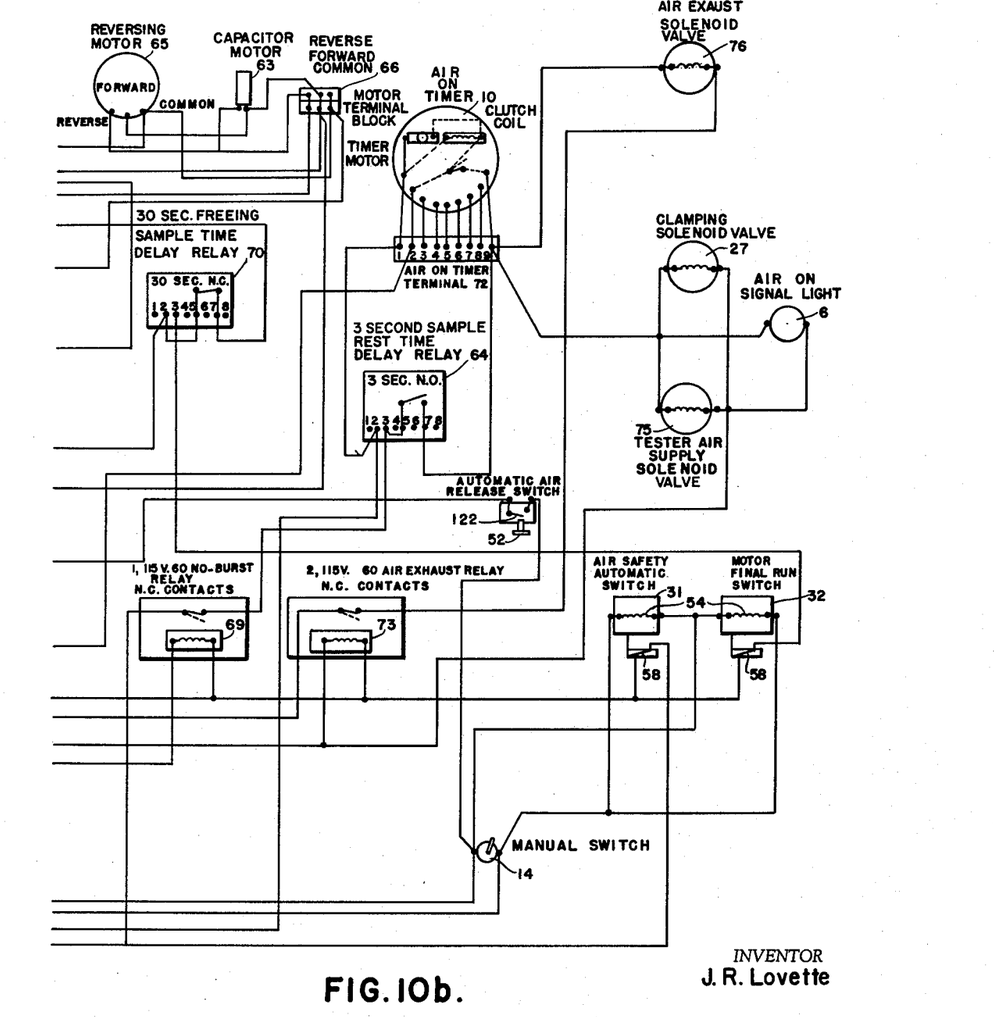
Figure 11:
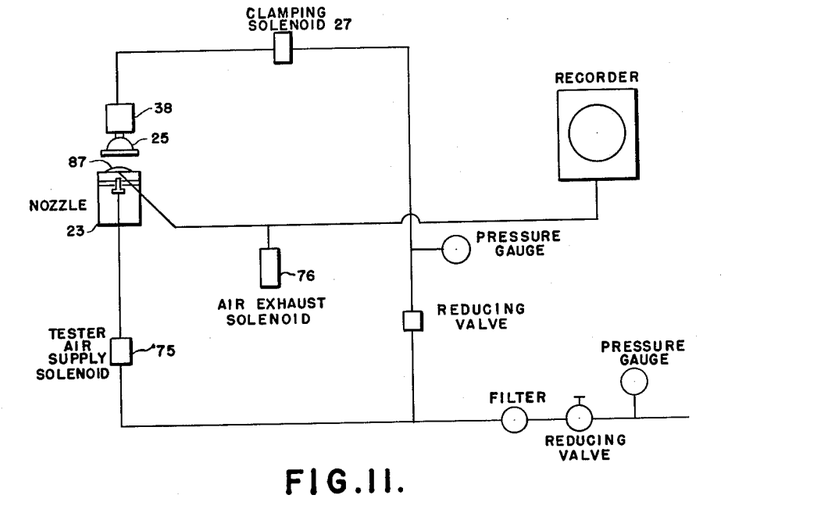
FIGURE 11 is a fluid circuit diagram.

All electrical components are interconnected by wiring shown in FIGURES 10a and 10b. The pneumatic diagram, as illustrated in FIGURE 4, shows that beneath the base plate 17 are included supply piping 82, air supply filter 77, the main line air pressure regulator 78, the main line 0–100 pounds indicating pressure gauge 79, the clamping solenoid air pressure regulator 80, the clamping solenoid 0–100 pounds indicating pressure gauge 81, the tester body air supply solenoid 75, and the air exhaust solenoid 76.

The filter 77 is used to supply clean dry air for all pneumatic functions. The regulator 78 is used to maintain a constant pressure on its outlet side so that there is a constant regulated flow of air. The gauge 79 is used so that the pressure can be adjusted and observed if necessary. This constant regulated air flow is piped through the pipe 82a to the inlet port marked I on the tester air supply solenoid 75 where its use will be hereinafter described. The air supply solenoid 75 is a standard type solenoid having an inlet port I, an outlet port O and an exhaust port E. This solenoid is familiar to those in the art. The outlet port of the solenoid 75 is connected to the air inlet port of the tester body 23 by piping 82a.

This constant regulated flow of air is also piped through piping 82 to the inlet of pressure regulator 80 where it is reduced in pressure and this pressure indicated on the gauge 81. The regulator 80 is used to adjust the air pressure to the inlet port marked I on the clamping solenoid 27 and, therefore, is the pressure that clamps the sample when it is under test. This pressure must always be set at a higher value than the pressure required to burst the sample. Both regulators 78 and 80 and both indicating pressure gauges 79 and 81 can be set and adjusted by testing personnel from the front of the case. In normal operation the adjustment of these regulators would be very infrequent.

The clamping solenoid 27 is a three-way solenoid, understood by those familiar with the art, and has an inlet port marked I, an outlet port O and an exhaust port E. The function of solenoid 27 will be explained in the detailed operation. The outlet port O of the solenoid 27 is connected to the cylinder 38.

Also installed beneath the base plate 17 is the air exhaust solenoid 76. This solenoid is a standard piece of equipment and is a two-way solenoid having an inlet port I and an outlet port O. Solenoid 76 is connected to the exhaust port 92 of the tester body 23 by pipe 82b which, for convenience, connects by a T 84 to the plastic or other tubing 83 run to the recorder 4.

Referring more particularly to FIGURES 4, 7, 8 and 9, 86 designates a cap plate, 87 the gum rubber or other distendable diaphragm, 88 a cap positioning pin, 89 a cap, 90 a spacer plug and 91 a nozzle.

The cap plate 86 is preferably constructed of steel and machined to the following specifications. The top surface that comes in contact with the sample during testing is flat and has a circular opening in its center that is 1.302 inches in diameter. Starting 1/16 of an inch from the edge of the circular opening there is a series of concentric 60° V-grooves countersunk 0.01 inch and separated by 1/32 of an inch. The inside edge of the plate 86 that comes into contact with the rubber diaphragm 87 is rounded by means of an arc of 0.25 inch radius and is relieved of sharpness so that the diaphragm will not be cut when it is pressurized. It will be realized that these dimensions are ideal and I do not wish to be restricted to the same.

When the sample is under test, the bottom flat surface of the clamping head assembly 25 and the top flat surface of the cap plate 86 and the circular edge of the openings in the head 25 and cap plate 86 must be concentric to within 0.01 inch.

A socket 126 is drilled or otherwise produced in the cap plate 86 opening only through the underside in location to receive the upper portion of the positioning pin 88. The cap 89 is threaded to the body 23 and as it overlaps a part of the cap plate 86 it clamps the cap plate tightly around the edges of the diaphragm 87 which thereupon becomes sealed and pressure-tight. The positioning pin 88 holds the cap plate 86 so that it does not move and roll the diaphragm 87 when the cap 89 is being screwed down on the tester body 23 to seal the diaphragm 87.

A hole 127 is drilled in the top center of the plug 90. This hole is counterbored as indicated at 128 on the bottom of the plug.

The counterbore 128 is made to allow the plug to pass over the large part of the nozzle 91 below the reduced tip 129. The purpose of the plug 90 is to take up the space that had to be drilled into the tester body 23 in order to install the nozzle 91. By using this spaced plug 90 the volume of air under the diaphragm is decreased and can be exhausted quickly so that the diaphragm is pressured only when a test is taking place. In other words the diaphragm chamber 130 is reduced in volume to a substantial minimum.

Referring more particularly to FIGURES 4, 7, 8 and 9, the nozzle 91 is preferably made of stainless steel with an opening at its tip, that is, .016 of an inch. The tip of the nozzle 91, when the tester body is assembled, is preferably flush with the top of the spacer plug 90 with the center hole in the plug fitting down over the nozzle. The threaded end of the nozzle 91 matches the threads that have been tapped in the tester body 23 to receive the nozzle. There is a rubber O-ring 94 that seals the air at the top of the thread on the threaded end of the nozzle and against the counterbore in the hole that is drilled and tapped to receive the nozzle. The largest diameter of the nozzle is machined to facilitate the use of a 1/4 inch box wrench to tighten the nozzle and seal the O-ring 94.

The tester body 23 is made of steel and has two holes drilled in it that are tapped to receive 1/4 inch pipe. One hole 93 is drilled in its flat bottom center. The other hole 92 is drilled through the right wall and angles upward at, for instance, 51° so that part of its opening is between the top of the spacer plug 90 and the bottom of the diaphragm 87 when the tester body is assembled. The hole 93 is reduced to, for instance, 3/32 of an inch in diameter until it reaches the threaded hole that is drilled and tapped to receive the nozzle 91. The hole 93 is the air inlet port. The hole 92 is the exhaust port. There is a hole 97 drilled in the right top of the tester body 23 being for instance 3/16 of an inch in diameter and 1/2 inch deep into which positioning pin 88 is driven.

On the top portion of the tester body 23 there is drilled and tapped hole 1.302 inches in diameter and 1 1/8 of an inch to receive the spacer plug 90 and on the bottom surface of this hole there is another hole drilled and tapped to receive the nozzle 91. The latter hole is 1/4 of an inch in diameter and 7/16 of an inch deep and tapped for N. F. threads, 28 t.p.i. This 1/4 inch hole is counterbored at its top part 1/8 of an inch deep, and 19/64 of an inch in diameter to receive the large portion 91a of the nozzle. The outside diameter of the threaded top part of the tester body may be 3.512 inches and is threaded to match the tester cap 89 having 16 t.p.i.—R.H.

It will be appreciated that the dimensions given are preferred and will give excellent results. However, the invention is not limited to dimensions. The orifices 91 with tip opening .016 inch helps to regulate the time required to bulge the diaphragm in a uniform controlled manner.

Figure 13:
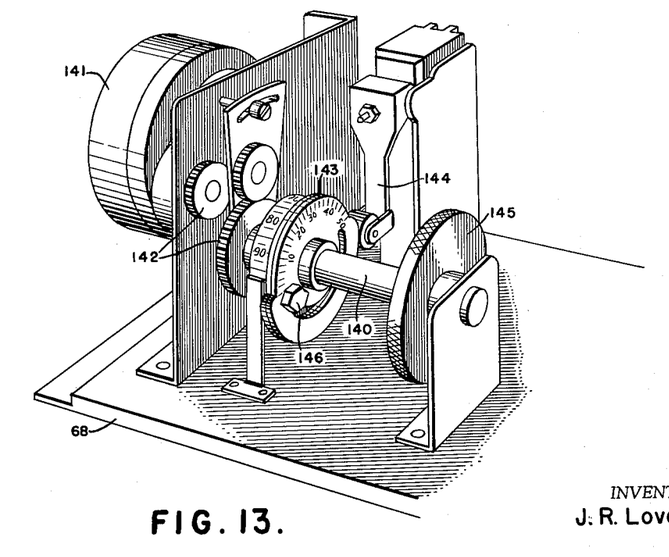
FIGURE 13 is a fragmentary view of a form of primary sequence timer illustrating drive cam and switch arrangements.

Referring more particularly to FIGURE 13, a form of primary sequence timer 68 includes at least in part a cam shaft 140 driven by a motor-drive unit 141 through a gear train 142. The cams 143 are adjustable angularly about the cam shaft 140 so that their lobes or high points may be caused to operate switches 144 in selected timing sequence. After adjustment the cams 143 are made fast to the cam shaft 140 so as to rotate therewith by lock nuts 146 or other suitable means. The cam shaft has affixed thereto a knurled or other hand wheel 145 for engagement by the operator's finger or hand to hold the cam shaft 140 from rotating when angularly adjusting the cams 143 around the cam shaft 140.

This form of timer is a standard piece of equipment and comprises five timers, five contact arms and five roller cams. Each cam 143, when loosened, allows the two sections of the cam to be slipped, thereby adjusting the raised and depressed portion of the cam over its full travel.

Simply then, the on-off time is adjusted by loosening lock nut 146 on each separate cam, sliding the two cam portions to the desired on-off time and relocking; then, by holding wheel 145, each cam assembly can be slipped on the shaft to its proper position so that sequencing will take place as desired.

CIRCUITRY AND OPERATION

Step I

A sample strip, of the material to be tested, of any length desired and of a width to fit within the flanges of the trays 21 and 21b; for instance of a minimum width of nine inches and a maximum width of nine-and-three-quarters inches, is inserted by the operator into the sample entrance chute 13 and pushed back over the front section of the sample-carrying trays 21 until its leading edge is positioned between the top rubber roll 102 and the bottom rubber roll 103 of the sample pull-through roll assembly 101.

Step II

The operator thereupon depresses the manual forward-run push button 11 which energizes the circuit to the reversible motor 65 through the motor capacitor 63, causing the motor 65 to run in its forward direction and the motor-on signal light 12 to glow, indicating that the motor is running. This circuit is energized as long as the operator holds push button 11 in its depressed position. When the motor 65 runs in its forward direction it causes the gear train, illustrated in FIGURE 6, to rotate the bottom roll 103 and through frictional engagement to also rotate in relative reverse direction the top roll 102. The sample is thereby drawn into position between the rolls 102 and 103 so that when the tester is in the motor-run sequence, the sample will automatically be drawn over the carrying trays 21 and 21b and will finally move out through the exit chute 24 at the rear of the case.

During this Step II, the operator by holding push button 11 in its depressed position allows the sample to run through rolls 102 and 103 until he is certain that the sample is running straight. This requires only a few inches of the sample. If the sample starts through the tester on an angle the operator can correct the same by releasing push button 11, deenergizing the circuit to the motor 65 and the signal light 12 and depressing the manual reverse-run push button 7 which energizes a circuit through capacitor 63 and the signal light 12 causing the light to glow (indicating the motor is running), and the motor 65 to run in its reverse direction and, accordingly, driving the rolls 102 and 103 in a reverse direction to move the sample backwards toward the entrance chute 13 until it is free on the front side of rolls 102 and 103. The operator then releases push button 7 which de-energizes the reverse operation circuit and then depresses push button 11 and positions sample correctly.

Push buttons 7 and 11 are used only to position sample and when either one is energized all other functions of the tester are by-passed electrically as shown in the wiring diagram in FIGURES 10a and 10b.

The manual power-off push button 8 is used only when the operator wants to shut down all electrical and pneumatic functions of the tester after the automatic sequence has begun. The tester will start again in proper sequence by depressing automatic-run push button 9.

*Step III*

The operator now moves the manual switch 14 to its "on" position thereby energizing simultaneously the coils 54 of the motor final-run switch assembly 32 and the air safety switch assembly 31, causing the armatures 55 on which the roller type micro switches 59 are mounted to move downward until the rollers 57 strike the sample causing the roller arms 58 to relatively rise and thereby energizing the micro switches 59 normally open contacts. The tester is now ready to be placed in automatic operation.

When micro switch 59 on the motor final-run switch assembly 32 is held in its closed position by the sample being over the slot 20 in the carrying tray 21, the following electrical circuit is established: power flows through the closed contacts of switch 59 energizing the heater coil of the thirty-second time delay relay 70 causing its normally closed contacts to open and thereby de-energizing the release coil of the holding relay 74, so that automatic sequence may take place.

When no sample is over slot 20 in the carrying tray, roller 57 drops into slot 20, thereby causing the contacts on switch 59 to open and de-energize the heater coil of the thirty-second time delay relay 70 causing its normally closed contacts (after a thirty-second delay) to energize the release coil of the holding relay 74 and thereby shutting down all electrical power to the tester. The thirty-second delay is necessary to allow the sequence timer 68 to run long enough to supply power to the pull-through mechanism 102, 103 so that the sample is on the free side of the pull-through rolls and the operator may pull it from the exit chute 24 at the end of the sample run.

When the micro switch 59 on the air safety automatic switch assembly 31 is held in its closed position by the sample being over the slot 19 in the carrying tray, the following electric circuit is established: power flows through the closed contacts of switch 59 energizing a circuit through the contacts of relay 69 (in proper sequence) to the heater coil of the three-second time delay relay 64 causing its normally opened contacts to close, thereby en-energizing a circuit to the air-on timer 10 so that the clamping, bursting and exhaust sequences can take place on the signal from the sequence timer 68.

When there is no sample over slot 19, the roller 57 drops down into slot 19, thereby de-energizing the circuit through switch 59 as described above and thereby cutting the clamping, bursting and exhaust sequences out of the circuit, so that if the sequence timer 68 signals for this action to take place during the motor final-run step, the rubber diaphragm 87 cannot be pressurized.

The micro switch rollers 57 are now located directly over the slots 19 and 20 in the carrying tray 21 and are upheld by the sample S. As the sample moves between the rollers 57 and the tray 21, the rollers will rotate and will therefore not bind the sample.

*Step IV*

The operator now depresses momentarily the automatic run push button 9 which energizes a circuit to the following, as shown in the wiring diagram:

The holding coil in holding relay 74 causing its normally open contacts to close and to be held in this position by a mechanical latch and energizing a circuit to the chart drive motor and counting mechanism in the recorder chart 4, and thereby causing the chart to move and the counting mechanism to reset to "0" reading, and also energizing the cam drive motor in the primary sequence timer 68; causing the cam shaft to rotate at a constant speed and also energizing the motor 65 circuit, causing it to run in its forward direction and through the gear train causing rolls 103 and 102 to rotate and the sample to move over the trays 21 and 21b toward the exit chute 24.

A circuit to the coil of relay 69 is also energized causing its normally closed contacts to open so that no bursting action may take place while the sample is being pulled through the tester. The #1 cam follower at this point is on the low or depressed portion of #1 cam of the primary sequence timer 68 and will remain on this portion for a predetermined time; for instance thirty-three seconds, allowing a linear quantity, for instance eighteen inches, of the sample to pull through the tester. The signal light 12 is also energized at this time indicating that the motor 65 is running. At the end of a thirty-three second period or other preselected time interval, the #1 cam follower will have been engaged by the raised or high portion of #1 cam and the motor 65 circuit will be de-energized, the signal light 12 will be de-energized and the coil of relay 69 will be de-energized allowing its normally closed contacts to close energizing a circuit to the three second time delay relay 64 which then times out for three seconds before energizing a circuit to the air-on timer 10.

The three second time delay relay is required so that the motor 65, its gear train and the rolls 102 and 103 have stopped rotating before the sample is clamped in place and thereby prevents tearing of the sample.

The primary sequence timer 68 in actual operation may be stopped at end of test, in any position. By this is meant that it may be stopped on the raised or depressed portion of any of the cams 1 through 5 that are used to sequence the tester. Which cam it stops on is determined by the length of the sample as will become evident as the detailed description proceeds.

The cams are driven by a cam drive motor (see wiring diagram) at a constant speed. Each cam may be adjusted 360° on the cam shaft. The raised and depressed portions of the cams may be adjusted also. This arrangement provides an unlimited number of sequence settings and makes the tester quite versatile as to the distances that may be set between bursts.

The timing sequence may be set as required, but for the purpose of this description they are as follows:

The cams 1 through 5 are set in sequence on the cam shaft. The depressed part of cam #1 is adjusted so that the cam follower roller is on the depressed part of cam #1 for a preselected time period, for instance thirty-three seconds, and on the raised portion for a lesser preselected time period, for instance fifteen seconds. The thirty-three seconds is the motor 65 running time and the fifteen seconds is the maximum burst time.

Cam #2 is adjusted so that its cam follower roller drops into the depressed part on cam #2 at the end of the total forty-eight seconds that #1 cam is in the sequence controlling position. Cams 3, 4 and 5 are or may be adjusted in a like manner so that at the end of two hundred forty seconds #1 cam would again be the controlling cam. The timer 68 will run and maintain this sequence until the sample passes over the slots 19 and 20 in the carrying tray 21 allowing the motor final-run action to take place and thereby shutting down the tester. Also for the purpose of this description you will note on the wiring diagram that cam #1 is in the control position and assume that the cam follower roller is on the depressed portion of #1 cam and, therefore, in the motor 65 run sequence.

With the cams adjusted as described there is a burst every eighteen inch interval on the sample. It should be evident that in actual operation a partial motor run sequence or a full burst sequence could take place immediately after the operator depresses the automatic run push button 9, this being governed by the position of the controlling cam when the previous test was completed.

Step V

The calibrated dial of air-on timer 10 is preset to one second. This is a permanent setting and should never have to be changed.

Through the air-on timer 10 a circuit is energized momentarily to the holding coil of air circuit relay 71, causing its normally open contact to close and to be held closed by a mechanical latch. Through closed holding relay 71 a circuit is energized to the following components instantaneously:

The coil of the tester air supply solenoid 75 allowing it to move to its open position and directing a regulated air flow through its outlet port into the tester body 23, air inlet port 93 to the tip of the nozzle 91 where the air flow is introduced under the gum rubber diaphragm 87 in a uniform controlled manner and at the same time energizing the air-on signal light 6, causing it to glow and indicate that the air pressure is on, and the coil of the clamping solenoid 27 allowing it to move to its open position and directing a regulated air flow through its outlet port O to the clamping positioner or motor 38.

The pressure causes the piston 39 to move downward clamping the sample S firmly between the bottom 25$^b$ of the clamping head 25 and the cap plate 36 of the tester body 23 thus holding the sample S firmly so that it will not slip when the diaphragm 87 is pressured. The coil of relay 73 is also energized causing its normally closed contact to open and thereby de-energizing the coil of the air exhaust solenoid 76; and thereby closing its inlet port and sealing off the exhaust port 92 of the tester body assembly 23 so that the air is trapped under the diaphragm 87. As the air pressure increases under diaphragm 87 it also increases in the measuring element of the recording chart 4 and drives the recording pen up scale on the chart and causes the diaphragm 87 to bulge until a burst takes place in the sample.

The recorder chart 4 measures and registers the pressure required to cause this burst to take place and its integrating mechanism registers the bursting point on the accumulative totalizing counter 15 and its counting mechanism registers the burst on the burst counter 16. The diaphragm 87 having burst the sample and protruding through it, rises a suitable distance; for instance ⅜ of an inch, contacts the sensing head 52 of the automatic air release switch assembly 121, 122, lifting the sensing head and closing the switch 122, 121 thereby energizing a circuit to the release coil of relay 71, thus causing the mechanical latch of the relay 71 to release its contact to its normally open position and thereby de-energizing the circuit to the following:

The coil of solenoid 75 allowing it to move to its closed position so that the air is shut off at its inlet port and its exhaust port is in the open position allowing the air in the tester body 23 to back flow and bleed through solenoid 75, exhaust port to atmosphere. The signal light 6 is de-energized indicating that the air pressure is off.

The coil of solenoid 27 is de-energized allowing it to move to its closed position so that there is no flow of air through its inlet port and its exhaust port is in the open position allowing the air trapped in the clamping positioner 28 to back flow and bleed out solenoid 27 exhaust port to atmosphere and the return spring 40 of positioner 28 to push the piston 39 to its "up" position and thereby lifting the clamping head assembly 25 and unclamping the sample.

The coil of relay 73 being de-energized causes its normally closed contact to energize the coil of solenoid 76 so that it moves to its open position allowing the air to escape from the tester body 23, exhaust port 92 through solenoid 76 inlet and outlet ports to atmosphere, and the air from connecting tube 83 and the measuring element of recording chart 4 to escape in the same manner causing the recording pen to drop to zero on the chart.

It is necessary to use solenoid 76 because the air under the diaphragm must be exhausted as quickly as possible to prevent overflexing of the diaphragm 87 and the possibility of false pressure readings caused by the diaphragm pressing against the sensing head 52. If the air under the diaphragm 87 had to back flow through the nozzle 91 it would take too long a time and would cause the effects as above stated.

The automatic clamping and burst sequence (Step V) will take place (on samples bursting in the 0–100 p.s.i. range) in a time period of one to twelve seconds after the holding coil of relay 71 has been energized. The cam follower roller of the controlling cam is on the raised portion of the cam for a period of fifteen seconds. Therefore, there is a short period after each burst when this time is running out that there is no action taking place except that the cams and cam shaft are rotating and that the chart drive mechanism is also running. When this time does run out the cam follower roller of the next cam in sequence drops into the depressed portion of this cam causing the motor-run sequence to take place again. Therefore, the sequence outlined in the preceding description is repeated, causing the sample to be drawn through the tester eighteen inches each time the motor 65 runs and the sample to be clamped, pressured and a burst to take place and be recorded on the chart and totalized and counted on counters 15 and 16 as long as the end of the sample has not passed under switches 31 and 32 and from between the rollers 57 and the slots 19 and 20 in the carrying tray 21.

Step VI

When the sample passes from between the rollers 57 and the slots 19 and 20 in the carrying tray 21 allowing the rollers 57 to drop down into the slots 19 and 20, the contacts of switches 59 are opened. The switch 59 on switch assembly 32 de-energizes the following:

The thirty-second time delay relay 70, which then after a thirty-second time delay interval (during which time the final motor run step takes place) causes its normally closed contacts to energize a circuit to the release coil of holding relay 74, which thereby releases the mechanical latch in relay 74, de-energizing its contacts and thereby de-energizes all electric circuits in the tester.

The switch 59 on switch assembly 31 de-energizes a circuit through relay 69 and time delay relay 64 to the air-on timer 10 and thereby cuts out all pneumatic functions as explained above.

The relay 70 function is to allow the motor 65 to run long enough to move the end of the sample from the slots 19 and 20 on the carrying tray 21 to the back or free side of rolls 102 and 103 so that the operator may pull the sample out of the exit chute 24 of the tester.

The operator now moves switch 14 to its "off" position, de-energizing simultaneously the coils 54 of the motor final-run switch assembly 32 and the air safety switch assembly 31 causing the armatures 55 on which the roller type micro switches 59 are mounted to move upward and thereby raising rollers 57 above slots 19 and 20 in the forward carrying tray 21 so that the next sample may be inserted. The operator then removes the completed sample from the exit chute 24, tears off the strip chart and reads the figures on totalizing counter 15 and burst counter 16 and divides the figure from counter 16 into the figure from counter 15 and writes the average Mullen on the strip chart along with sample identifying number.

It will be appreciated by those skilled in the art that further objects of the invention are as follows:

(1) To provide a device to test strips of the material under test (as mentioned in the foregoing), thereby obtaining an average test result rather than a spot test result over the full length of the sample of the material under test.

*Example.*—From one end of the web to the other in a cross machine direction on a paper making machine.

(2) To provide a fully automatic device to take a number of burst tests on a given sample of the material under test and to produce figures needed to compute the average bursting strength across the full length of the sample.

(3) To provide a device to test materials as mentioned in the foregoing in conformity with established testing standards.

(4) To provide a device having a totally unique and novel method as to the principle of the testing mechanism.

(5) To provide a device having an integral part that is unique and novel that provides a means of clamping the material under test securely with view to the bursting strength of the material under test.

(6) To provide a device having an integral part that is unique and novel that senses when the burst has taken place and automatically releases the clamping head and stops the action that has caused the bursting to take place and readies tester for the next sequence in its automatic operation.

(7) To provide a device that records each burst separately and then totalizes the bursting pressure of all the bursts over a given sample on a totalizing counter and counts the number of bursts over a given sample and produces figures for computing the average bursting strength over the full length of the sample of the material under test.

(8) To provide a device that will, by a unique and novel method, increase the pressure under the diaphragm in a uniform controlled manner without the use of a liquid, a pump or a cylinder and piston arrangement and will thereby achieve highly accurate results.

(9) To provide a device that will not require special seals or liquids to insure its proper operation.

(10) To provide a device that allows the diaphragm to expand the same distance on each burst, regardless of the pressure required to cause the burst and thereby greatly increasing the life of said diaphragm.

(11) To provide a device that is a unique and novel method of returning the diaphragm to its neutral or no pressure position instantaneously after the bursting has taken place.

(12) To provide a device that produces a permanent record of the average bursting strength over the full length of a given sample.

(13) To provide a device that has an integral part that is a new and unique means that will allow samples of any length to be run through the device for testing purposes.

A fundamental feature of this invention is the use of pneumatic principles rather than hydraulic principles to produce a displacement of the diaphragm to cause a bursting of the material under test.

Another feature is the use of pneumatics rather than hydraulics to produce the clamping of the sample under test.

An additional feature is the automatic postioning of the sample so that a number of tests can be taken over the full length of the sample.

Another feature is the use of a device to sense when the burst has taken place and to instantaneously stop the action that has caused the bursting to take place.

Another feature of this invention is the use of a sensing device that causes the diaphragm to instantaneously return to its neutral or no pressure position.

Another feature is that, except for inserting sample and starting the device, all actions are automatic.

Another feature of this invention is a sensing device that will allow a sample of any length of the material to be tested to be run through the tester.

For the purpose of the claims the members 27, 75 and 76 have been denoted as electrically or solenoid actuated valves, the 30 sec. time delay relay as freeing sample time delay relay 70, the 3 second time delay relay as sample-rest time delay relay 64, relay 69 as no-burst relay and relay 73 as air exhaust relay.

Although I have disclosed herein the best form of the invention known to me at this time, I reserve the right to all such modifications and changes as may come within the scope of the following claims.

What is claimed is:

1. For use with an elongated test sample and a Mullen testing machine including a tester body, a distensible diaphragm over a fluid pressure diaphragm space in the body, a clamping head movable toward and from the body for clamping the sample to the body over the diaphragm, and a fluid pressure clamp motor for driving the clamping head against the tester body, a control apparatus comprising
electrically-actuated valve means for governing the admission and evacuation of fluid pressure to and from the space beneath the diaphragm and the fluid pressure clamp motor,
a sample feeding means for moving the sample through the machine,
an electric motor coupled to drive the sample feeding means,
a primary sequence timer comprising a plurality of adjustable cams, a cam drive motor for continuously rotating the cams, switches opposite the cams having cam followers controlled by the cams to cause the switches in one position to energize the sample feeding electric motor and in another position to cause the energizing of the electrically-controlled valve means to deliver burst pressure to the diaphragm space and motive pressure to the fluid pressure motor,
an air-on-timer in circuit with the electrically-actuated valve means,
an air circuit relay having a holding coil, a mechanical latch therefor and a release coil and having normally open contacts,
a circuit from the air-on timer to the holding coil of the air circuit relay for closing its contacts and energizing the electrically-actuated valve means,
a sample-rest time delay relay in circuit with the air-on timer having normally open contacts,
a no-burst relay having normally closed contacts in circuit with the sample-rest time delay relay,
a motor circuit relay having a holding coil, a mechanical latch therefor, and a release coil and having normally open contacts which when closed energize
(I) a circuit to the cam drive motor in the primary sequence timer,
(II) a circuit to the sample drive electric motor causing the motor to run in forward direction and to advance the sample through the machine,
(III) a circuit to the no-burst relay for opening the contacts thereof to prevent energizing of the air-on timer while the sample is in motion,
a freeing sample time delay relay having normally closed contacts initially in circuit with the release coil of the motor circuit relay to shut off all power to the apparatus,
a motor final run switch and an air safety automatic switch positioned to be held closed by contact with the test sample and to open automatically when the sample runs out, means to open and close the motor final run and air safety automatic switches and to move the same out of the path of a fresh test sample, a circuit from the closed motor final run switch to the freeing sample time delay relay to open its normally closed contacts and de-energize the release coil of the motor circuit relay, means for thereupon energizing the holding coil of the motor circuit relay, a circuit from the closed air safety automatic switch through the closed contacts of the no-burst relay to the heater coil of the sample-rest time delay relay causing its normally open contacts to close and energizing a circuit to the air-on timer to establish clamping, bursting and exhaust sequence on the signal from the primary sequence timer, and a normally open switch positioned to be contacted and closed by the diaphragm in burst position for energizing the release coil of the air circuit relay.

2. A control apparatus as claimed in claim 1 further comprising an exhaust port opening out of the diaphragm space of the tester block of large cross-section, a normally closed electrically actuated exhaust valve means for governing evacuation of the diaphragm space through the exhaust port, an air exhaust relay having normally closed contacts in circuit with the exhaust valve means for releasably maintaining the exhaust valve means closed, and means for opening the contacts of the air exhaust relay to allow opening of the exhaust valve means in time with the closing of the other electrically actuated valve means.

3. For use with an elongated test sample and a Mullen testing machine including a tester body; a distensible diaphragm over a fluid pressure diaphragm space in the body, a clamping head movable toward and from the body for clamping the sample to the body over the diaphragm, and a fluid pressure clamp motor for driving the clamping head against the tester body, a control apparatus comprising electrically-actuated valve means for governing the admission and evacuation of fluid pressure to and from the space beneath the diaphragm and the fluid pressure motor, a sample feeding means for moving the sample through the machine, an electric motor coupled to drive the sample feeding means, a chart drive motor, a recorder including a burst counter, totalizing counter and integrating mechanism, a primary sequence timer comprising a plurality of adjustable cams, a cam drive motor for continuously rotating the cams, switches opposite the cams having cam followers actuated by the cams to move the switches in one position of the cams to energize the sample feeding electric motor and in another position of the cams to cause energizing of the electrically-actuated valve means to deliver burst pressure to the diaphragm space and motive pressure to the fluid pressure motor, an air-on timer in circuit with the electrically-actuated valve means, an air circuit relay having normally open contacts, a holding coil, a mechanical latch therefor and a release coil, a circuit from the air-on timer to the holding coil of the air circuit relay for closing its contacts and energizing the electrically-actuated valve means, a sample-rest time delay relay in circuit with the air-on timer having normally open contacts, a no-burst relay having normally closed contacts in circuit with the sample-rest time delay relay, a motor circuit relay having a holding coil, a mechanical latch therefor and a release coil and having normally open contacts which when closed energize:

(I) a circuit to the chart drive motor, burst counter, totalizing counter and integrating mechanism in the recorder, (II) a circuit to the cam drive motor in the primary sequence timer, (III) a circuit to the sample drive electric motor causing the motor to run in forward direction and to advance the sample through the machine, (IV) a circuit to the no-burst relay for opening the contacts thereof to prevent energizing of the air-on timer, a freeing sample time delay relay having normally closed contacts initially in circuit with the release coil of the motor circuit relay to shut off all power to the apparatus, a motor final run switch and an air safety automatic switch positioned to be held closed by contact with the test sample and to open automatically when the sample runs out, means to open and close the motor final run and air safety automatic switches and to move the same out of the path of a fresh sample, a circuit from the closed motor final run switch to the freeing sample time delay relay to open its normally closed contacts and de-energize the release coil of the motor circuit relay, means for thereupon energizing the holding coil of the motor circuit relay, a circuit from the closed air safety automatic switch through the closed contacts of the no-burst relay to the heater coil of the sample-rest time delay relay causing its normally open contacts to close and energizing a circuit to the air-on timer to establish clamping, bursting and exhaust sequences on the signal from the primary sequence timer, and a normally open switch positioned to be contacted and closed by the diaphragm in burst position for energizing the release coil of the air circuit relay.

References Cited by the Examiner
UNITED STATES PATENTS

| | | | |
|---|---|---|---|
| 358,056 | 2/87 | Mullen | 73—102 |
| 2,826,063 | 3/58 | Astley | 73—102 |

RICHARD C. QUEISSER, *Primary Examiner.*

DAVID SCHONBERG, *Examiner.*